(12) United States Patent
Maeng (10) Patent No.: US 6,476,873 B1
(45) Date of Patent: Nov. 5, 2002

(54) ENHANCEMENT OF A SELECTABLE REGION OF VIDEO

(75) Inventor: Joon Maeng, Austin, TX (US)

(73) Assignee: Vtel Corporation, Austin, TX (US)

( * ) Notice: Subject to any disclaimer, the term of this patent is extended or adjusted under 35 U.S.C. 154(b) by 0 days.

(21) Appl. No.: 09/178,081

(22) Filed: Oct. 23, 1998

(51) Int. Cl.$^7$ .............................................. H04N 1/409
(52) U.S. Cl. ..................... 348/561; 348/576; 348/581; 348/240; 382/299; 345/671; 725/87; 725/86
(58) Field of Search ................................ 348/561, 652, 348/576, 580, 581, 582, 240, 704; 382/298, 256, 299, 254, 266; 345/671, 670, 660, 661, 723; 725/87, 86; H04N 1/409, 1/42

(56) References Cited

U.S. PATENT DOCUMENTS

| | | | | |
|---|---|---|---|---|
| 4,282,550 A | | 8/1981 | Coviello ..................... 358/160 |
| 4,528,585 A | | 7/1985 | Bolger ......................... 358/22 |
| 4,751,507 A | * | 6/1988 | Hama et al. ................ 345/119 |
| 4,800,379 A | | 1/1989 | Yeomans ..................... 340/731 |
| H997 H | * | 11/1991 | Bronson ..................... 395/118 |
| 5,128,776 A | * | 7/1992 | Scores et al. ............... 358/426 |
| 5,161,035 A | * | 11/1992 | Muramatsu ................. 358/451 |
| 5,223,934 A | | 6/1993 | Hong ......................... 358/209 |
| 5,282,051 A | * | 1/1994 | Walker ....................... 358/401 |
| 5,289,548 A | * | 2/1994 | Wilson et al. .............. 382/250 |
| 5,302,968 A | * | 4/1994 | Heberle ...................... 345/131 |
| 5,321,520 A | * | 6/1994 | Inga et al. ................... 358/403 |
| 5,333,212 A | * | 7/1994 | Ligtenberg .................. 382/250 |
| 5,426,513 A | * | 6/1995 | Scores et al. ............... 358/433 |
| 5,610,995 A | * | 3/1997 | Zheng et al. ............... 382/183 |
| 5,661,824 A | | 8/1997 | Allebach et al. ........... 382/298 |
| 5,666,160 A | | 9/1997 | Hwang ....................... 348/240 |
| 5,745,379 A | * | 4/1998 | Lewis ......................... 709/247 |
| 5,754,348 A | | 5/1998 | Soohoo ....................... 359/802 |
| 5,896,465 A | * | 4/1999 | Coppola ..................... 382/232 |
| 5,949,551 A | * | 9/1999 | Miller et al. ................ 358/408 |
| 5,973,680 A | * | 10/1999 | Udea ......................... 345/327 |
| 6,058,218 A | * | 5/2000 | Cline ......................... 382/254 |
| 6,091,859 A | * | 7/2000 | Sonobe et al. ............. 382/298 |
| 6,226,040 B1 | * | 5/2001 | Kuo et al. .................. 348/446 |
| 6,269,175 B1 | * | 7/2001 | Hanna et al. ............... 382/107 |

* cited by examiner

Primary Examiner—John W. Miller
Assistant Examiner—Jean W. Désir
(74) Attorney, Agent, or Firm—Hamilton & Terrile, LLP; Robert W. Holland (57) ABSTRACT

A digital enhancement method enhances a subsection of video. Video is received by a receiver from a sender. The video includes information or displaying a video image. The subsection of the video for digital enhancement is selected. The selecting the subsection of the video for enhancement includes partitioning the video image into the selected subsection and a remainder unselected subsection. The selected subsection is digitally enhanced by the sender to provide the video including a digitally enhanced subsection. The video including the digitally enhanced subsection is received by the receiver from the sender.

38 Claims, 6 Drawing Sheets

| | |
|---|---|
| GOB 1 | GOB 2 |
| GOB 3 | GOB 4 |
| GOB 5 | GOB 6 |
| GOB 7 | GOB 8 |
| GOB 9 | GOB 10 |
| GOB 11 | GOB 12 |

FIG. 7A

| 1 | 2 | 3 | 4 | 5 | 6 | 7 | 8 | 9 | 10 | 11 |
|---|---|---|---|---|---|---|---|---|----|----|
| 12 | 13 | 14 | 15 | 16 | 17 | 18 | 19 | 20 | 21 | 22 |
| 23 | 24 | 25 | 26 | 27 | 28 | 29 | 30 | 31 | 32 | 33 |

ENHANCEMENT OF A SELECTABLE REGION OF VIDEO

BACKGROUND

1. Field of the Invention

This invention relates generally to the fields of multimedia and videoconferencing and, more particularly, to displaying a selected area of video having a greater image quality than an unselected area of video.

2. Description of the Related Art

Videoconferencing and/or display of remotely recorded video have achieved broad acceptance in many types of enterprises to facilitate communication between isolated individuals or groups. Also, the local display of locally stored video has become a commonplace capability in modern information processing systems (e.g., personal computer systems, workstations, etc.).

Various types of communication lines are used in videoconferencing to facilitate communication between isolated parties and/or to facilitate the communication of information to and from remote locations. Isolated parties may be remotely located from each other and therefore require communication lines such as regular telephone lines and/or higher speed lines such as asynchronous transfer mode (ATM) transmission lines and Integrated Services Digital Network (ISDN). Alternatively, such isolated parties may be at a local site within which communication may be facilitated through the use of, for example, a communication line of a local area network (LAN).

The quality of displayed video (e.g., in a videoconference) depends largely on the frame rate (e.g., number of frames per second) which is to be maintained. For example, a low frame rate can produce a clear image, whereas image quality decreases if the frame rate increases and the transmission rate remains the same.

The frame rate depends on the information transfer rate of the communication line used in a given application. Many enterprises which use videoconferencing use ISDN lines to transfer information at a rate of 128 Kbps. Products in the consumer market, however, are often designed for the "Plain Old Telephone Service" (POTS) lines which have an information transfer rate at or below 33.6 Kbps. The quality of video transferred at POTS and basic ISDN rates are marginally acceptable in most applications. Such communication lines have a frame rate which varies from one to 10 fps at POTS rates and 5 to 15 fps at ISDN rates. Although the information transfer rate may remain the same, frame rate may vary depending on the amount of information required to be transferred to update an image. For example, the amount of change in an image from one frame to the next frame affects the amount of information transmitted to update the image which in turn causes the frame rate to vary. For example, if there is a lot of motion in the image, frame rate may decrease although the overall information transfer rate remains the same.

Most videoconferencing equipment use video compression technologies to reduce the amount of information to transmit through communication lines. Compression technology in videoconferencing has difficulty maintaining high frame rate and good quality image. One must often be sacrificed in favor of the other. Such is especially true with low bit rates such as basic ISDN and POTS rates.

A video source typically attempts to update the entire video image all the time. However, in many applications in videoconferencing and video on demand, a viewer may only need or desire to look at a particular area of the video image with great detail, at a high frame rate, or both. In videoconferencing applications such as remote diagnosis regarding a patient and remote security monitoring systems, it is often desirable to look at details of a certain area of an image instead of looking at the overall image of the remote site at poor quality.

For example, a doctor who is examining a patient remotely via a videoconferencing system over low bandwidth lines such as basic ISDNI rate lines may want to look at the details of a small area of a patient's face or hand. The quality of video transmitted from the patient site at basic ISDN rate is marginally acceptable but the frame rate is around 10 frames per second on the average if there is no excessive motion in the image. The doctor must make a diagnosis regarding the patient in a conventional mode in which the entire image from the patient site is updated. As noted, the doctor may want to look at a small area on the face or hand of the patient in detail to closely examine the area. Conventional videoconferencing systems do not provide a way to indicate the small section which the doctor wants to observe, nor can they provide a detailed image of the section.

A similar exemplary situation exists in the context of remote security monitoring systems. Conventionally, the security officer watches an overall image of a remote site such as a remotely observed factory. Occasionally, the security officer may want to examine a suspicious section of the received image in detail if he/she notices something suspicious in the area. Because conventional videoconference systems typically update the entire image at all times, one does not have a choice to observe a small section in the image in detail at higher frame rate.

SUMMARY

It has been discovered that a particular area of video may be enhanced in a videoconferencing, video on demand, or similar environment. A methods of digital enhancement and a video region enhancer and system therefore are provided to enhance an area of video smaller than an overall transferred video image in order to provide better quality or greater detail in the relevant area. By specifying an area of video which a system user desires to be viewed, a sender can enhance the image in the specified area by updating the small area at a higher frame rate, improving the resolution of the small area, and/or improving image quality within the area. Information regarding the non-specified area can be reduced and/or sent at a slower rate. Such capability is especially useful in such fields as remote medical diagnoses and remote security systems, for example.

In one embodiment, a digital enhancement method enhances a subsection of video. Video is received by a receiver from a sender. The video includes information for displaying a video image. The subsection of the video for digital enhancement is selected. The selecting the subsection of the video for enhancement includes partitioning the video image into the selected subsection and a remainder unselected subsection. The selected subsection is digitally enhanced by the sender to provide the video including a digitally enhanced subsection. The video including the digitally enhanced subsection is received by the receiver from the sender.

In another embodiment, a system enhances a region of video. The system includes a user interface, a video source, a sending unit and a receiving unit. The sending unit includes a video region enhancer encoder. The video region enhancer encoder is coupled to receive video from the video source. The video includes information for displaying a video image. The video region encoder digitally enhances a selected subsection of the video responsive to the selected subsection being selected by the video region enhancer decoder. The receiving unit includes the video region enhancer decoder. The video region enhancer decoder is coupled to receive video region enhancer window selection notifications from the user interface. The video region enhancer decoder is coupled to receive the video from the video region enhancer encoder. The video region enhancer decoder partitions the video image into a selected subsection and an unselected subsection responsive to receiving a selection notification.

In another embodiment, a method for enhancing a region of video includes selecting a region of video for digital enhancement and digitally enhancing the selected region. The selecting the region of video for enhancement includes defining a selected region of the video and a remainder unselected region of the video such that the video consists of the selected region and the unselected region.

In another embodiment, a method for enhancing a subsection of video includes receiving video by a receiver from a sender. The video including information for displaying a video image. The method further includes selecting the subsection of the video for digital enhancement. The selecting the subsection of the video for enhancement includes partitioning the video image into the selected subsection and a remainder unselected subsection. The method further includes receiving the video by the receiver from the sender after selecting the subsection of the video. The video includes a digitally enhanced subsection corresponding to the selected subsection after selecting the subsection of the video.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following description is intended to provide a detailed description of at least one example of the invention and should not be taken to be limiting of the invention itself. Rather, any number of variations may fall within the scope of the invention which is defined in the claims following the detailed description.

A sending unit transmits video to a receiving unit at a particular average transmission rate. Thus, a particular amount of information is sent to update an image in a particular amount of time. A user at the receiving end of the video transmission identifies to the sending unit a smaller section of the image he desires to look at in detail. The sending unit enhances the video quality of the specified section by reducing the proportion of information sent regarding the area outside the specified section and increasing the proportion of information sent regarding the area inside the specified section which is the area of interest to the user at the receiving end. The sender uses more bits for the selected area to send a better quality image in the specified section and/or to update the image in the specified section at a higher frame rate by reducing the number of bits consumed for the area outside the specified section.

The method(s) and apparatus described herein provide a digitally enhanced image within the specified area of interest, and the corresponding tool is referred to herein as a video region enhancer (VRE) because the relatively smaller, specified area of interest, referred to herein as the VRE window, is enhanced with greater details of digital information. Thus, the VRE enables a viewer to specify a section of video (e.g., the VRE window) to be displayed with better quality and provides video sending unit with the capability of appropriately processing a notification of such a specified section. Instead of updating the entire image all the time, the VRE window can be updated more frequently and/or with more information than the area of the image outside the VRE window. The viewer can easily move the VRE window anywhere in the image and/or adjust the area and/or shape of the VRE window.

Figure 9:
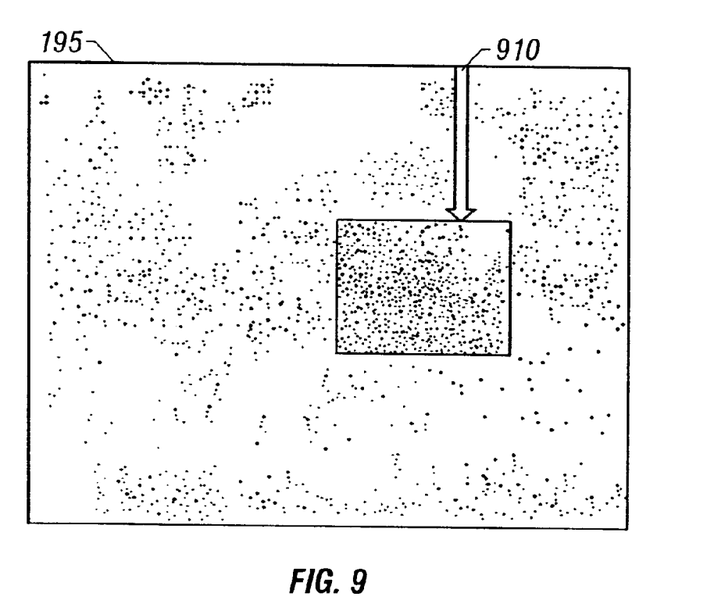
FIG. 9 depicts an exemplary video region enhancer window with accompanying gray-out and filtering in accordance with the invention.

Additionally, various aesthetic effects may be introduced into the viewed image. For example, the receiving unit may slightly darken and/or de-emphasize the outside of the VRE window to emphasize the VRE window and/or improve the overall appearance of the image. The process of darkening the non-specified section of the image is referred to herein as gray-out. Also, the receiving unit may filter the video information for the area outside the VRE window to smooth the appearance of the lesser quality video to emphasize the VRE window and/or improve the appearance of the overall image. Furthermore, a zoom function may be combined with the VRE capability. FIG. 9 shows an exemplary display 195 with VRE window 910 and with a grayed-out area surrounding VRE window 910.

Figure 1:
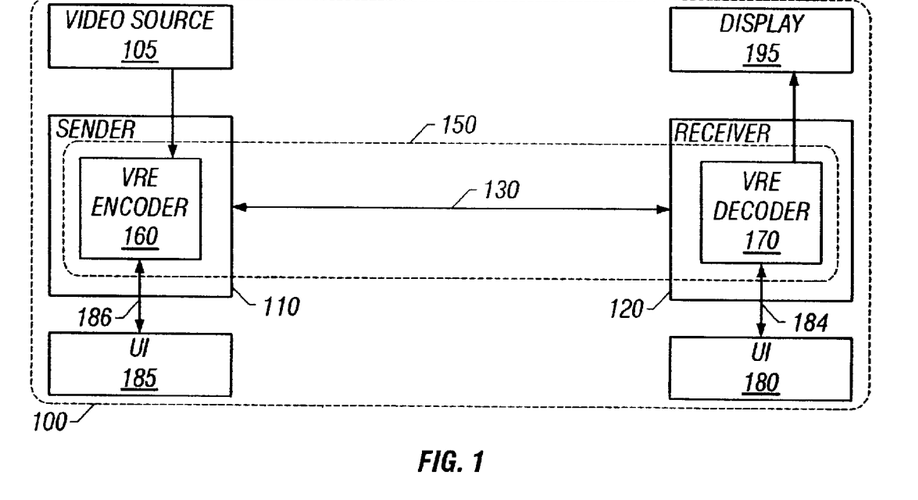
FIG. 1 shows one embodiment of a system implementing the video region enhancer in accordance with the invention.

Referring to FIG. 1, information processing system 100 includes a video region enhancer (VRE) 150 in accordance with the invention. System 100 includes sender 110, receiver 120, user interface 180 and user interface 185. Sender 110 is coupled to receiver 120 via a coupling such as communication line 130. User interface 180 is coupled to or integral with receiver 120. User interface 185 is coupled to or integral with sender 110. Sender 110 includes VRE encoder 160. Receiver 120 includes VRE decoder 170. VRE 150 includes VRE encoder 160 and VRE decoder 170. System 100 is coupled to receive video from video source 105 at sender 110 and is coupled to provide video to display 195 from receiver 120.

Figure 2:
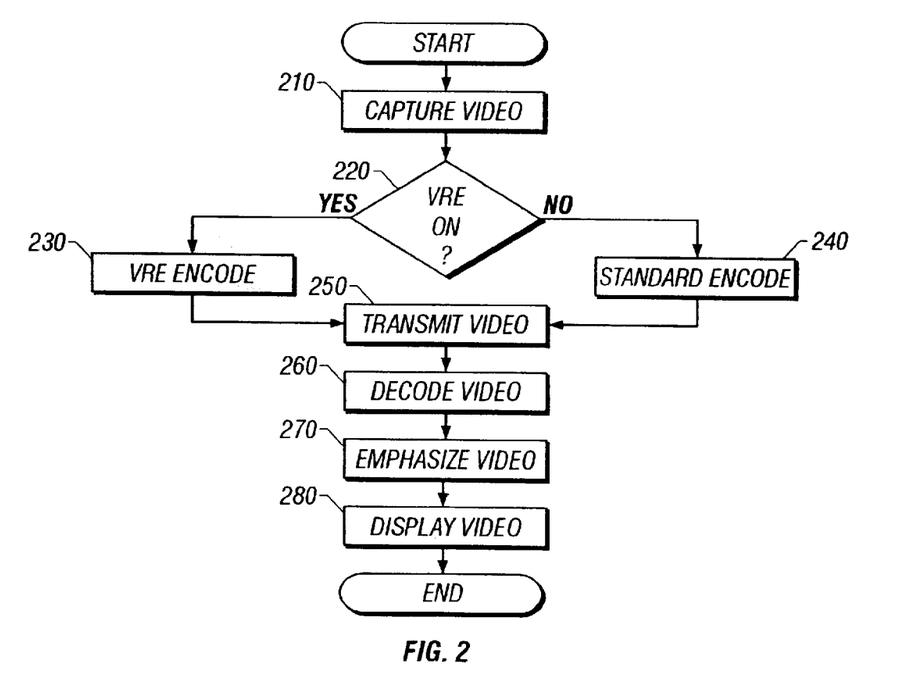
FIG. 2 is a flow chart showing the operation of one embodiment of the system of FIG. 1.

FIG. 2 shows a flow chart of an exemplary sequence of operations of system 100. During capture video operation 210, sender 110 receives video from video source 105. Video source 105 may be a camera or a video memory, for example, and may be integral with or coupled to sender 110. After capture video operation 210 and during VRE on decision 220, sender 110 determines if digital enhancement has been enabled. If digital enhancement has been enabled, VRE encoder 160 performs VRE encoding on the video during VRE encode operation 230. If digital enhancement has not been enabled, VRE encoder 160 performs standard encoding on the video during standard encode operation 240. After either one of VRE encode operation 230 and standard encode operation 240, the encoded video is transmitted from sender 110 to receiver 120 during transmit video operation 250. After transmit video operation 250, the video is decoded by VRE decoder 170 during decode video operation 260. After video decode operation 260, the overall video image is improved (e.g., portions are filtered and darkened) to create a more aesthetically pleasing image during emphasize video operation 270. After emphasize video operation 270, the video is displayed on display 195 during display video operation 280.

Video is transmitted from sender 110 to receiver 120 during one of two modes of operation: standard mode and VRE mode. For example, in standard mode, a normal video image is transmitted to receiver 120 during transmit video operation 250 if the VRE was off during VRE on decision 220. In VRE mode, a partially digitally enhanced video image is transmitted during transmit video operation 250 if the VRE was on during VRE on decision 220.

Figure 3:
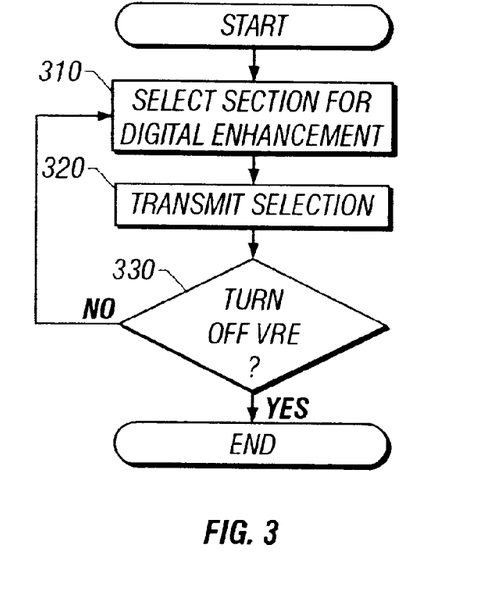
FIG. 3 is a flow chart showing the operation of one embodiment of the user interface of the system of FIG. 1.

FIG. 3 shows a flow chart of an exemplary sequence of operations of user interface 180. During select section operation 310, user interface 180 turns on VRE 150 by selecting a section of the image displayed on display 195 for digital enhancement by VRE 150. After select section operation 310 and during transmit selection operation 320, the selection is transmitted to sender 110. For example, the size and location of a VRE window which will display digitally enhanced video is transmitted to sender 110 via couplings 184 and 130. After transmit selection operation 320 and during turn off VRE decision 330, user interface awaits further selections from the user of system 100. If another selection is to be made (e.g., the position of the window is altered), a new selection is made during select section operation 310.

During the above described select section operation 310, a section of the transmitted video is selected for digital enhancement. For example, a VRE user uses user interface 180 to select a section of the video image received at receiver 120 in which the user desires to see greater detail. The VRE window (e.g., the image area of interest to the user which is selected for digital enhancement) can be turned on or off by the user via user interface 180. For example, the user may be viewing an image being transferred from a remote site by sender 110. When the user desires to more particularly view a portion of the image being transferred, the user can turn on the VRE window by clicking a button on a mouse of user interface 180. The VRE window may be turned off in a similar fashion.

The location, size, on/off status, etc. of the VRE window may be controlled by a mouse or other device such as a remote pointer, a touch control device, a keyboard, a voice input device, etc. The size of the VRE window may be fixed, selected from a few predetermined sizes, or variable. For example, the size of the VRE window can be predetermined between VRE encoder 160 and VRE decoder 170. Alternatively, and possibly selectively, the size can be specified by user interface 180 during the videoconference. A user observing display 195 may use a mouse of user interface 180 and/or receiver 120 to move a cursor on display 195 to indicate an area of interest for the VRE window. A variable VRE window size may be indicated by a method similar to drawing a box in commonly available drawing software such as clicking and holding a mouse button at a first location and moving the mouse to a second location where the mouse button is released. A square or rectangle, for example, is thereby defined having horizontal and vertical sides and a corner at the first location and a corner at the second location. Other shapes may also be indicated in a similar fashion. The user can later change the location, the size, or both the location and size of the VRE window.

After select section operation 310 and during transmit selection operation 320, information identifying the selected section is transmitted to sender 110. For example, after the VRE window is moved on display 195 by moving the cursor on display 195, information describing the move (e.g., the position of the cursor) is transmitted to sender 160. User interface 180 may also transmit coordinates demarcating a square or rectangle outlining the section that the user desires to examine or other VRE window selection information, for example.

Referring again to FIG. 2, during VRE on decision 220, sender 110 determines if selection information has been received from user interface 180. If selection information has been received, the identified section of video (e.g., the VRE window) is digitally enhanced. Digital enhancement may be accomplished by increasing the frame rate of the section, increasing the quality of the section, or any combination thereof. Furthermore, VRE encoder 110 may zoom-in on the area selected. Exemplary digital enhancement techniques are discussed in greater detail hereinafter.

Referring to FIGS. 1–3, sender 110 receives video from video source 105 (e.g., a camera, a memory, a transmission line, etc.) Sender 110 provides video to receiver 120 via communication line 130. Receiver 120 provides video to display 195 for viewing by a system user. User interface 180 provides control information to sender 110 regarding the type of video information desired at display 195. For example, the control information indicates whether the system user desires standard video or digitally enhanced video displayed.

During standard operation, VRE encoder 160 sends standard video information to VRE decoder 170 which performs any necessary decode so that the video information may be displayed on display 195. For example, VRE encoder 160 performs standard compression on the image captured by camera 105 and updates the entire image to receiver 120. Receiver 120 receives the entire image sender 110 transmits.

When the system user desires to more particularly observe a portion of the video display, user interface 180 sends control information designating that portion of the display to be digitally enhanced. VRE encoder 160 uses the control information provided by user interface 180 via communication line 130 to determine the position of VRE window. VRE encoder 160 then digitally enhances the designated portion of the video information before providing the video information to VRE decoder 170. VRE encoder 160 switches from a standard compression technique to an appropriate VRE compression technique and starts sending VRE compressed video information. If the system user wants to move the VRE, the system user can move the cursor to a new position on the screen. Whenever a new position is selected, the new position is transferred to sender 110 so that VRE encoder 160 can move the VRE window. The receiver can turn the VRE window off, for example, by clicking the left button on the mouse again.

Upon receipt of the standard or VRE compressed video information, VRE decoder 170 performs any necessary decode so that the video information may be displayed at display 195. VRE decoder 170 may also gray-out the non-digitally-enhanced portion of the video information so as to emphasize the digitally enhanced portion of the video. Furthermore, VRE decoder 170 may also apply a filter to smooth the non-digitally-enhanced portion of the video information to create a more pleasing image for the user of system 100.

Figure 4:
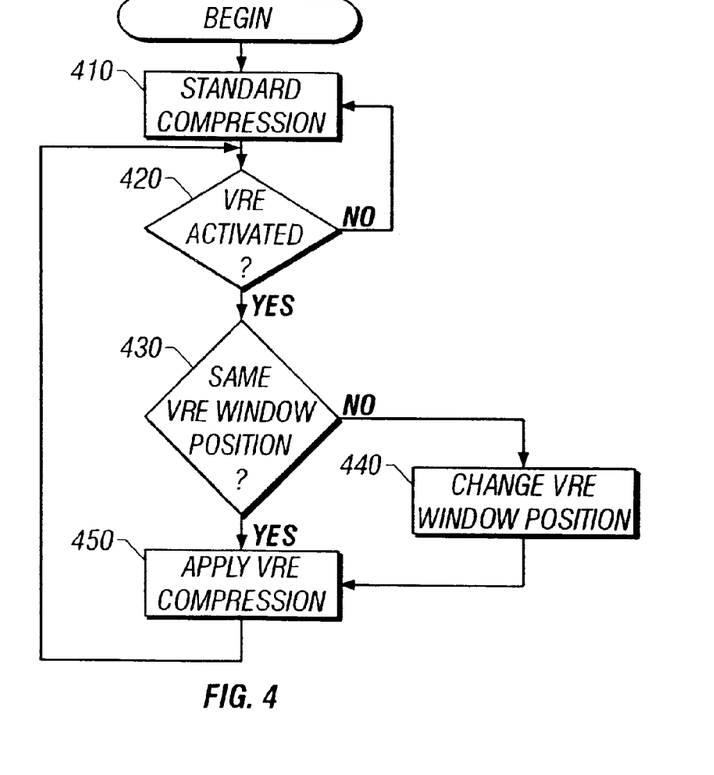
FIG. 4 is a flow chart showing the operation of one embodiment of the receiver of the system of FIG. 1.
Figure 5:
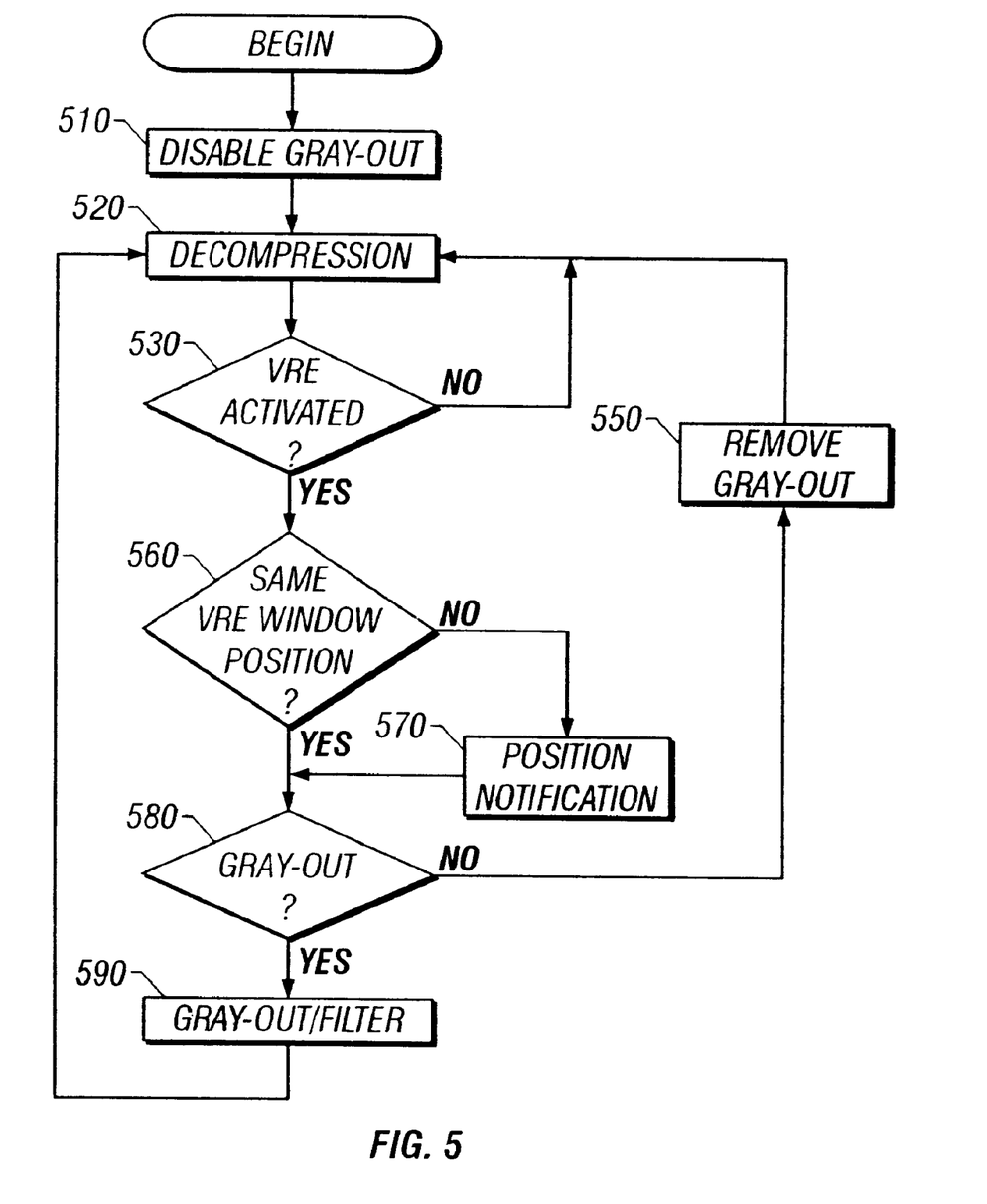
FIG. 5 is a flow chart showing the operation of one embodiment of the sender of the system of FIG. 1.

FIGS. 4 and 5 show flow charts of exemplary sequences of operations of sender 110 and receiver 120, respectively. In the embodiment of FIGS. 4 and 5, user interface 180 is integrated with receiver 120, and a system user is located at receiver 120. Thus, for example, in the embodiment of FIGS. 4 and 5, UI 180 and coupling 184 of FIG. 1 are internal to receiver 120. Receiver 120 is coupled to provide VRE window selection information (e.g., on/off, size and location information) to sender 110 via communication line 130. Also, in the embodiment of FIGS. 4 and 5, receiver 120 grays and filters the non-selected portion of the image outside of the VRE window.

Referring to FIG. 4, VRE encoder 160 encodes the video received from video source 105 and transmits either standard encoded video or VRE encoded video to VRE decoder 170. For example, during standard compression operation 410, VRE encoder 160 initially compresses the video according to a standard compression technique. After standard compression operation 410 and during VRE activated decision 420, VRE encoder 160 determines whether a VRE window has been activated by user interface 180. After VRE activated decision 420 and during same VRE position decision 430, VRE encoder 160 determines if the VRE win,dow has the same position as a previously activated VRE window if such a VRE window has been previously activated. A change of position includes any change in the status of the VRE window such as a change in shape, size, location, etc. If the newly activated VRE window is determined to have not changed position during same VRE position decision 430, VRE encoder 160 compresses the video according to a VRE compression technique during VRE compression operation 450 which is discussed hereinafter. If the newly activated VRE window has changed position from the last VRE window, VRE encoder first changes the VRE position during change VRE position operation 440 before compressing the video according to the VRE compression technique during VRE compression operation 450.

During VRE compression operation 450, the VRE encoder 160 uses at least one of various compression techniques to process the video. For example, because communication line 130 of FIG. 1 has a particular transmission rate measurable in bits per second, a particular number of frames on average are transmitted per second (i.e., the frame rate), giving a particular number of bits per frame. When the VRE window has been activated, various compression techniques may be used to digitally enhance the portion of the image within the VRE window.

The video information corresponding to the VRE window is compressed according to a first compression technique, and the video information corresponding to the area outside of the VRE window is compressed according to a second compression technique. For example, frame rate can be traded off against image quality. VRE encoder 160 may update the VRE window at the same frame rate, and provide higher resolution to the image inside the VRE window. VRE encoder 160 may increase the frame rate (e.g., double the frame rate) and provide the best resolution it can at that rate. Also, VRE encoder 160 may adjust the update rate of the area outside the VRE window. For example, VRE encoder 160 may not update the area outside of the VRE window until the VRE is deactivated, or VRE encoder 160 may update the outside area at the same rate as the VRE window but assign smaller amount of bits to the outside area. For example, 60% of the number of bites for each frame may be assigned to update the VRE window and 40% of the number of bits for each frame may be assigned to update the area outside the window. The aforementioned techniques are discussed in greater detail hereinafter with reference to FIGS. 6–8.

Referring to FIG. 5, receiver 120 decompresses received video and provides the decompressed video to display 195 without gray-out as shown in operations 510 and 520. Specifically, during disable gray-out operation 510, gray-out is initially disabled so that the entire video image received from VRE encoder 160 is shown on display 122. After disable gray-out operation 510 and during decompression operation 520, VRE decoder 170 performs decompression on the received video. VRE decoder 170 performs the same decompression whether or not the image received from VRE encoder 160 includes digitally enhanced video.

VRE decoder 170 then determines if digital enhancement is activated during VRE activated decision 530. If the VRE window is not active during VRE activated decision 530, control returns to decompression operation 520. If VRE decoder 170 determines that the VRE window is activated during VRE activated decision 530, control transitions to VRE position decision 530.

During VRE position decision 530, VRE decoder 170 determines if the position of the VRE window has changed. If the VRE window has the same position, control transitions to gray-out decision 580. If the VRE window has changed position (e.g., a system user has selected a new area for enhancement via user interface 180), the newly selected position is transmitted to VRE encoder 160 during position notification operation 570. The VRE window is automatically changed at receiver 120 and display 195 because VRE encoder 160 changes the position of the VRE window during change VRE position operation 440 responsive to the notification, as discussed above. After position notification operation 570, control transitions to gray-out decision 580.

During gray-out decision 580, VRE decoder determines if gray-out is enabled. If gray-out is enabled, VRE decoder 170 grays-out and filters the non-digitally enhanced area around the VRE window during gray-out and filter operation 590. In the presently described embodiment, VRE decoder 170 of receiver 120 performs any necessary or desired gray-out operations such as darkening and/or fading the area outside the VRE window during gray-out and filter operation 590. To improve the overall appearance of the image presented, VRE decoder 170 also applies la smoothing filter to reduce artifacts outside the VRE window during gray-out and filter operation 590. The aforementioned gray-out and filter operation is independent from the compression/decompression operations. Receiver 120 may include a separate component other than VRE decoder 170 to perform the above described aesthetic gray-out and filter functions. An exemplary resulting VRE window 910 on display 195 is shown with gray-out in FIG. 9.

If receiver 120 determines that gray-out is not enabled during gray-out decision 580, then the gray-out is removed from the displayed video during remove gray-out operation 550. If gray-out is disabled, then no further action need be taken prior to displaying the received video, and receiver 120 receives and decompresses the next received video during decompression operation 520.

Figure 6:
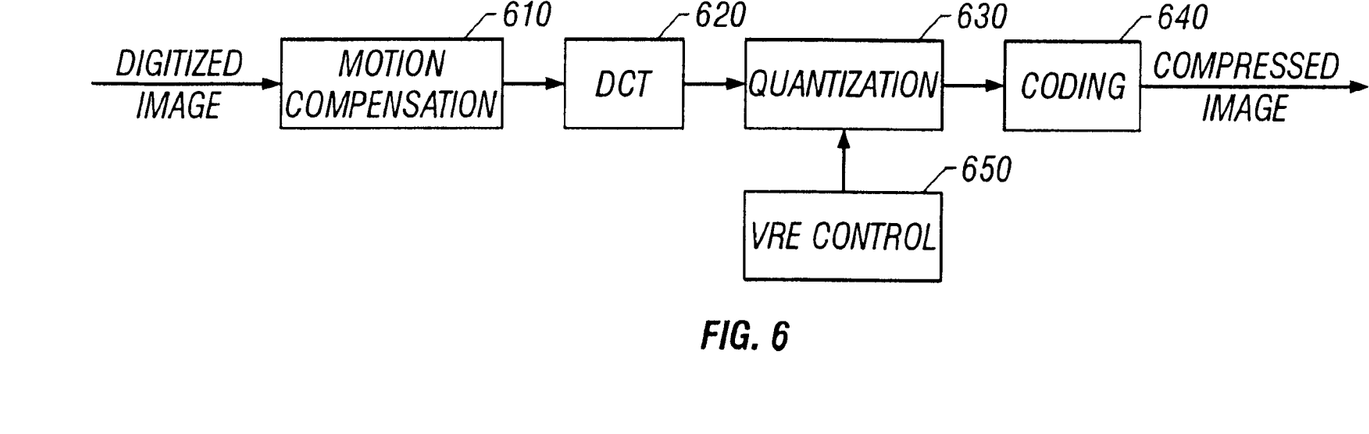
FIG. 6 is a block diagram showing video coding blocks of one embodiment of the sender of the system of FIG. 1.

Referring to FIG. 6, an exemplary video image is processed according to a compression technique by the logic blocks 610–650 which comprise an exemplary VRE encoder 160. FIG. 6 may also be viewed as a flow chart showing an exemplary compression technique for processing a video image according to operations 610–640 with operation 630 depending on operation 650 which provides for user interaction with VRE encoder 160.

VRE encoder 160 processes video according to at least one of a variety of communications standards. For many types of communications lines, there are various videoconferencing recommendations/standards specified by the International Telecommunications Union (ITU). For example, recommendation H.320 provides a standard for ISDN lines, recommendation H.324 provides a standard for POTS lines, recommendation H.323 provides a standard for LAN lines, and recommendation H.310 provides a standard for ATM lines, and so on.

Figure 7A:
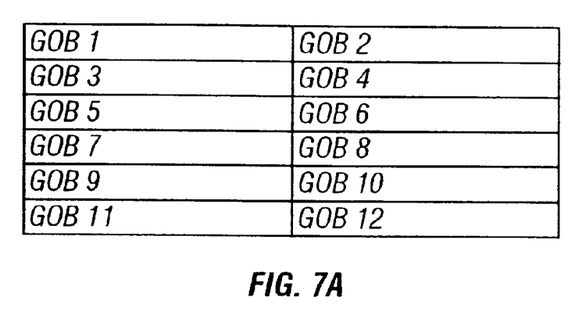
FIG. 7A depicts a video image partitioned into groups of blocks.
Figure 7B:
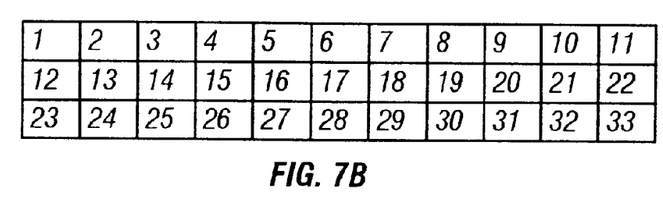
FIG. 7B depicts a group of blocks partitioned into macroblocks.
Figure 7C:
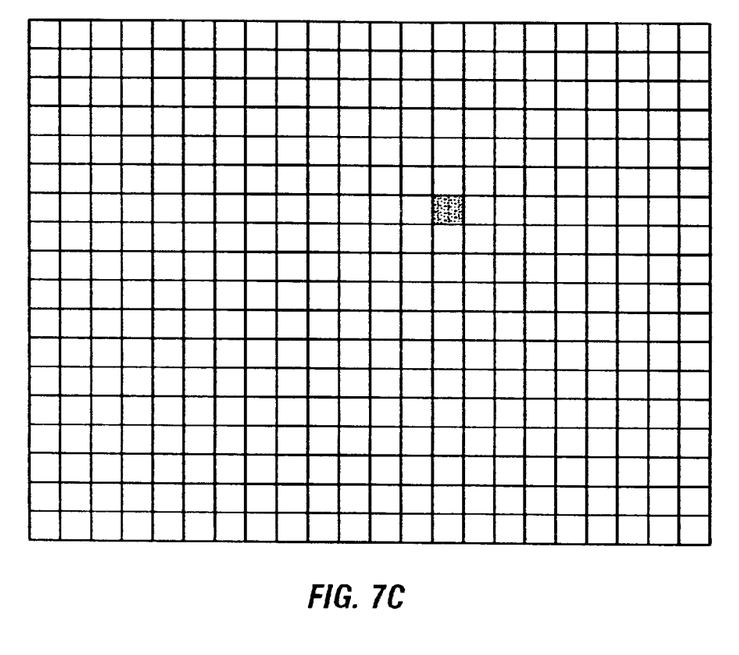
FIG. 7C depicts a video image partitioned into macroblocks.

The aforementioned standards process images on a block by block basis. For example, recommendation H.320 specifies compression standards in its H.261 recommendation. The H.261 recommendation uses the common intermediate format (CIF) which uses 352 pixels by 288 lines to represent an image. Referring to FIGS. 7A–7C, a CIF compliant image is subdivided into groups of blocks and further into macroblocks. Specifically, a CIF compliant image includes 12 groups of blocks. Each group of blocks (GOB) includes 33 macroblocks (MBs). FIG. 7A shows a CIF compliant image divided into 12 numbered GOBs. FIG. 7B shows an exemplary GOB divided into 33 numbered macroblocks. FIG. 7C shows a CIF compliant image divided into 396 macroblocks. Each block is uniquely identifiable and can be represented by the notation $B_{i,j}$ where i corresponds to a GOB number and j represents a macroblock number. For instance, the shaded block in FIG. 7C is macroblock 3 in GOB6 which is represented by $B_{6,3}$.

Referring again to FIG. 6, the images processed by are divided into blocks. The sizes of the blocks are 16×16 pixels for luminance and 8×8 for color components. To remove the temporal redundancy, blocks in consecutive frames are compared by motion compensation block 610. Specifically, for example, a first block having a first location in a first frame is compared to a second block in the first location in a second frame, the second frame which is a consecutive frame with the first frame. The differences between the first and second blocks in the two consecutive frames are processed by discrete cosine transformation (DCT) by DCT block 620. DCT block 620 generates coefficients which are quantized by quantizer 630 and coded by encoder 640 which is, for example, a run-length or arithmetic encoder.

The quality of video is largely determined by the quantizer step sizes. Fine quantization allows a restored image which will maintain good quality, but the amount of bits required is higher. On the other hand, coarse quantization produces a lower amount of required bits, but the restored image will not be as good as an image generated with fine quantization. Window controller 650 controls the level of quantization employed by quantizer 630. For example, window controller 650 uses relatively fine quantization on blocks within the digitally enhanced window and relatively coarse quantization on blocks outside of the digitally enhanced window.

Coder 640 uses a run-length and/or arithmetic coding to reduce the information found in the output of quantizer 630. The motion vector and the coded bits are then transmitted to receiver 120. Receiver 120 reverses the operations performed by encoder 160, and restores the original image as closely as possible.

The above discussed compression technique recommendations are optimized to produce the best images possible given a limited bandwidth under the assumption that the entire image will be compressed all the time. Window controller 650 determines which block to update and how many bits to assign to each block based on the recommendations specified in the standard and based on the type of encoding, standard or VRE, being used for the block in question. Thus, window controller 650 sets different levels of quantization for each block depending on whether a respective block is within the VRE window.

Figure 8:
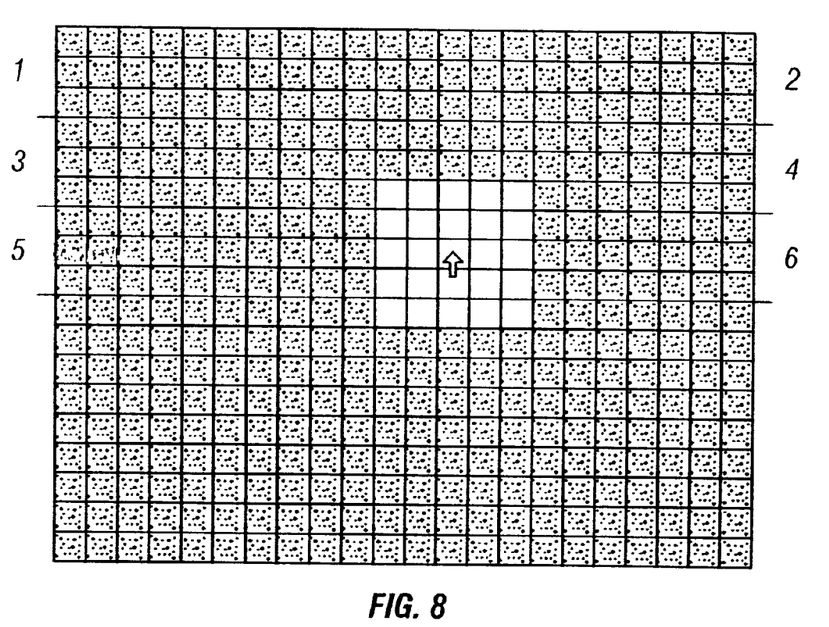
FIG. 8 depicts a video image partitioned into macroblocks with an exemplary video region enhancer window.

FIG. 8 shows an exemplary VRE window which has a size of 5×5 macroblocks and has a location centered about a cursor positioned at macroblock $B_{6,13}$ which is GOB6 and MB13. Because sender 110 was informed by user interface 180 that the cursor is located in GOB6 and MB13, VRE encoder 160 can determine the macroblocks in the VRE window: $B_{3,33}$, $B_{4,23}$–$B_{4,26}$, $B_{5,11}$, $B_{6,1}$–$B_{6,4}$, $B_{5,22}$, $B_{6,12}$–$B_{6,15}$, $B_{5,33}$, $B_{6,23}$–$B_{6,26}$, $B_{7,11}$, and $B_{8,1}$–$B_{8,4}$. Once the macroblock in the VRE window are determined, VRE encoder 160 can switch between standard and VRE encoding depending on the macroblock being processed. Specifically, VRE encoder 160 uses a first compression technique (e.g., a more efficient and perhaps lossy technique) to compress macroblocks outside the VRE window, and a second compression technique (e.g., a lossless, greater bandwidth consuming technique) to compress macroblocks inside the VRE window.

Once user interface 180 notifies sender 110 of the position of the VRE window, VRE encoder 160 uses at least one of various compression techniques to process the video. For example, communication line 130 of FIG. 1 has a particular average achievable transmission rate. Specifically, for example, if communication line 130 is an ISDN line, the transmission rate is 128 kilobits/second. Depending on the communications standard implemented and the equipment used, a frame rate corresponds to the transmission rate of communication line 130. For example, using the H.261 standard at the ISDN transmission rate, a frame rate of approximately 15 frames per second with CIF format is typically achieved. Given a frame rate of 15 frames per second and a transmission rate of 128 kilobits per second, each frame consumes about 8.5 kilobits (128 kbps/15 fps) on average.

The frame rate can be traded off against image quality. VRE encoder 160 may update the VRE window at the same 15 frames per second as the unselected area of video outside of the VRE window, and provide higher resolution to the portion of the image inside the VRE window. VRE encoder 160 may increase the frame rate to 30 frames per second, for example, and provide the best resolution it can at that rate.

Also, VRE encoder 160 may adjust the update rate of the area outside the VRE window compared to the update rate of the VRE window. For example, video transmitted from VRE encoder 160 has a uniform video update rate for an image prior to VRE window 910 being digitally enhanced. After digital enhancement commences, the portion of video for VRE window 910 may have a higher video update rate than the portion of video for the unselected area outside the VRE window. For example, VRE encoder 160 may update the area inside the VRE window at twice the rate of the area outside the VRE window, or VRE encoder 160 may not update the area outside of the VRE window until the VRE is deactivated.

VRE encoder 160 may update the outside area at the same rate as the VRE window but assign a smaller amount of bits to the area outside the VRE window. For example, if there are N number of bits for each frame, VRE encoder 160 may assign 60% of the N bits to the VRE window and 40% to the area outside of the VRE window. Also, for example, video transmitted from VRE encoder 160 may have a characteristic such as video information density which describes an amount of video information used to represent an area of the video and is measurable by bits per area, for example. During digital enhancement, the VRE window may have a video information density greater than the area outside the VRE window to provide greater detail in the VRE window. For example, a greater proportion of bits is used to describe an area inside the VRE window than is used to describe a similarly sized area outside the VRE window. An exemplary resulting VRE window 910 on display 195 is shown in FIG. 9.

The above described VRE techniques can be used in video compression applications such as videoconferencing as well as video on demand. The VRE is a very useful feature in cases in which bandwidth limitations must be traded off with video quality and frame rate. Although the VRE is very useful for low speed lines since it can improve the quality of the image inside the VRE window, the VRE is also applicable to higher line rates. For example, a higher resolution image than the surrounding area can be implemented at higher speed lines.

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

Referring to FIG. 1, sender 110 may be local storage to receiver 120, or sender 110 may be remotely coupled to receiver 120. For example, system 100 may be a computer system, sender 110 may include video storage 105, and receiver 120 may include display 195 for displaying the video provided by sender 110. Such an exemplary system 100 may include a single one of user interfaces 180, 185 so that a user of system 100 can control VRE 150.

Thus, although the above embodiment includes data compression across communication line 130, compression need not be implemented in accordance with the invention. For example, if video source 105 is a local memory of a computer system 100, VRE encoder 160 may receive the video information from memory and update the portion of the video information corresponding to the VRE window in using a first update technique and update the portion of the video information corresponding to the area outside of the VRE window using a second update technique. VRE encoder 160 may not update the area outside of the VRE window until the VRE window is deactivated or moved, or may update the area outside of the VRE window at a slower rate than the area inside the VRE window. In such an embodiment, VRE encoder 160 typically does not perform any image compression.

Also for example, sender 110 may be a remote information processing system, and receiver 120 may be a local information processing system. In such an example, VRE encoder 160 compresses the video information and transfers the video information from sender 110 to receiver 120. VRE decoder 170 then decompresses the video information. An exemplary system 100 is a videoconference system. Another exemplary system 100 is a security system. Another exemplary system 100 is a remote medical diagnosis system. Another exemplary system includes a combination of the above. A magnifying capability can be provided when the VRE is applied to a still image of text. An example can be using the VRE window to look at an expanded view of a document with fine letters.

Referring to FIG. 2, each of operations 210–280 are repeated for additional video frames or images. Operations 210–280 may occur in a parallel or pipelined fashion. For example, each of operations 210–280 may be occurring simultaneously but may be operating on different (e.g., consecutive) frames of video. Also, where appropriate, the order of operations 210–280 may be changed. For example, the video enhancement of emphasize video operation 270 may occur after VRE on decision 220 and before VRE encode operation 230. Also, some of operations 210–280 may be eliminated. For example, to increase simplicity of implementation, emphasize video operation 270 may be eliminated from the flow of FIG. 2.

Either or both of user interfaces 180, 185 may be included within system 100. In the above described embodiment, user interface 180 is coupled to or integrated with receiver 120. For example, in one embodiment, receiver 120 is a computer system including user interface 180 and coupling 184. The VRE window is initiated from receiver 120. In other embodiments, user interface 185 is coupled to or integrated with sender 110 which can then select the portion for enhancement. For example, in an educational environment, a professor may want to present a portion of an image in greater detail to viewers of display(s) 195. Thus, the VRE need not be turned on by a user collocated with the receiver. It can be initiated by a user collocated with the sender if appropriate. Various methods can be used to indicate the activation and deactivation of the VRE, moving the cursor and resizing the VRE depending on the input device one may use. FIG. 3 shows a flow chart of an exemplary sequence of operations of user interface 180. Similar operations may apply to the operation of user interface 185. In an embodiment in which user interface 185 controls the selection of the VRE window, the flowchart of FIG. 4 could, for example, be modified to eliminate operations 560 and 570, and operations 430 and 440 of FIG. 5 would be modified to combine the functionality of operation 560 with operation 430 and the functionality of operation 570 with operation 440.

Any one or more of various types of digital enhancement may be implemented in accordance with the invention. Also, a default or permanent type of digital enhancement may be preselected, or the type of digital enhancement may be programmed into system 100 at a configuration time or a run time. A programmed type of digital enhancement may be altered at run time.

The VRE function can be augmented by adding additional features such as capture, digital zoom, VRE with remote camera zoom. Instead of observing the moving image in the VRE window, one may want to capture the VRE window. A zoom-in capability can be added to the captured VRE window to expand the portion of the image captured in the VRE window. The VRE can be used in conjunction with remote camera zoom. The remote image can be zoomed-in when the VRE is activated and the center of image in the VRE window remains at the center of the VRE while being zoomed in.

The macroblock numbering technique discussed above for CIF compliant images (see, e.g., FIGS. 7A–7C) is one exemplary macroblock identification technique. Other types of block identification techniques may be used in accordance with the invention as long as each block can be uniquely identified. Other standards use other techniques to number blocks in an image.

The above described operations may be implemented using software modules. Various embodiments may use different types of source code or non-software based control methods such as application specific hardware or firmware implementations, or combinations thereof. In another embodiment, sender 110 and receiver 120 may be special purpose or general purpose microprocessors or microcontrollers operating under control of firmware or software modules. In another embodiment, sender 110 and receiver 120 are software modules operating on one or more computer systems, microprocessors or microcontrollers. In another embodiment, sender 110 and receiver 120 are computer systems operating under control of one or more of the above described modules.

In one embodiment, system 100 is a computer system. In another embodiment, sender 110 and receiver 120 are each computer systems. Various embodiments may include different types and configurations of computer systems. Computer systems are information handling systems which can be designed to give independent computing power to one user or a plurality of users. Computer systems may be found in many forms including but not limited to mainframes, minicomputers, workstations, servers, personal computers, notepads and embedded systems. A typical computer system includes at least one processing unit, associated memory and a number of input/output (I/O) devices. A computer system processes information according to a program and produces resultant output information via the I/O devices. A program is a list of internally stored instructions such as a particular application program and/or an operating system. A software module may includes a program. The programs that control the operation of a computer system are commonly referred to as software applications or simply software.

Those skilled in the art will recognize that boundaries between logic blocks are merely illustrative and that alternative embodiments may merge logic blocks or impose an alternate decomposition of functionality upon various logic blocks. Furthermore, those skilled in the art will recognize that boundaries between the functionality of the above described operations are merely illustrative. The functionality of multiple operations may be combined into a single operation, and/or the functionality of a single operations may be distributed in additional operations in accordance with the invention. For example, a turn on VRE operation may be separated from select section operation 320 so that an automatically selected section of video for digital enhancement is automatically turned on. Also, for example, the gray-out function and the filter function of gray-out and filter operation 590 may be performed as part of separate operations.

Moreover, alternative embodiments may include multiple instances of a particular component. For example, sender 110 and receiver 120 may each include a user interface for interacting with users of system 100. This is especially useful when sender 110 is remotely located from receiver 120.

As used herein, transmit includes sending information from one location to another location by any number of expedients. For example, transmit includes transmission via wire, fiber-optic cable, radio, or other expedient. Transmit also includes sending information directly or indirectly over a network such as a telephone or other data network, ISDN line, T1 line, T3 line, a local area network (LAN), a wide area network (WAN), the Internet, etc. Transmit also includes sending information between locations within a computer system and/or microprocessor.

Also, as used herein, the numeric designations "first," "second," etc. are used to generically reference various elements and do not necessarily require an order or time relationship. Thus, a first element and a second element, for example, may or may not have a particular relationship between them which corresponds to an inference drawn from the numeric designations. Any such relationship is determined by the context of the elements.

The above description is not intended to present an exhaustive list of embodiments of the invention. Although an attempt has been made to outline some exemplary variations, other variations are within the scope of invention as defined in the claims below.

What is claimed is:

1. A digital enhancement method for enhancing a subsection of video, the method comprising:
   receiving video by a receiver from a sender, the video including information for displaying a video image;
   selecting the subsection of the video for digital enhancement, the selecting the subsection of the video for enhancement including partitioning the video image into the selected subsection and remainder unselected subsection;
   digitally enhancing the selected subsection by the sender to provide the video including a digitally enhanced subsection; and
   receiving the video including the digitally enhanced subsection by the receiver from the sender;
   wherein
   the video has a first video information density measurable by bits per area, the first video information density describing an amount of video information used to represent an area of the video, the selected and unselected subsection of the video having the first video information density prior to the digitally enhancing the selected subsection by the sender; and
   the digitally enhancing the selected subsection includes generating the video including the selected subsection having a second video information density and unselected subsection having a third video information density, the second video information density being greater than the third video information density to provide greater detail in the selected subsection of the video image.

2. The method of claim 1 wherein
   the receiver selects the subsection for enhancement; and
   the method further includes the receiver notifying the sender of the selected subsection.

3. The method of claim 1 wherein the sender selects the subsection for enhancement.

4. The method of claim 1, wherein the digitally enhancing the selected subsection by the sender comprises:
   increasing a first resolution of the selected subsection; and
   decreasing a second resolution of the unselected subsection of the video.

5. The method of claim 1, wherein the digitally enhancing the selected subsection by the sender comprises:
   updating the selected subsection by the sender to provide greater detail in the selected subsection of the video than in the unselected subsection of the video.

6. The method of claim 1, wherein the second video information density is greater than the first video information density; and the third video information density is less than the first video information density.

7. The method of claim 1, wherein the video has a first video update rate prior to the digitally enhancing the selected subsection by the sender; and the digitally enhancing the selected subsection includes generating the video having a second video update rate for providing the selected subsection and a third video update rate for providing the unselected subsection, the second video update rate being greater than the third video update rate.

8. The method of claim 7, wherein the second video update rate is greater than the first video update rate; and the third video update rate is less than the first video update rate.

9. The method of claim 7, wherein the second video update rate is twice the third video update rate.

10. The method of claim 7, wherein the third video update rate is zero.

11. The method of claim 1, further comprising:

graying-out the unselected subsection.

12. The method of claim 11, wherein the graying-out the unselected subsection is performed by the receiver.

13. The method of claim 1, further comprising:

filtering the unselected subsection.

14. The method of claim 13, wherein the filtering the unselected subsection is performed by the receiver.

15. The method of claim 1, wherein the digitally enhancing the selected subsection by the sender comprises decreasing the compression of the selected subsection; and increasing the compression of the unselected subsection.

16. The method of claim 1, wherein the digitally enhancing the selected subsection by the sender comprises using a first compression technique on the selected subsection; and using a second compression technique different from the first compression technique on the unselected subsection.

17. The method of claim 16, wherein the first compression technique includes a first level of quantization; and the second compression technique includes a second level of quantization, the second level of quantization being coarse relative to the first level of quantization.

18. The method of claim 1, wherein the sender encodes the selected subsection using a first percentage of bits per area;

the sender encodes the unselected subsection using a second percentage of the bits per area.

19. The method of claim 18, wherein the first percentage is greater than the second percentage.

20. The method of claim 18, wherein the first percentage is 60%; and the second percentage is 40%.

21. The method of claim 1, wherein a position of the selected subsection is user programmable via a user interface coupled to the receiver.

22. The method of claim 1, wherein a position of the selected subsection is user programmable via a user interface coupled to the sender.

23. The method of claim 1 further comprising:

digital zooming the selected subsection to increase the size of the selected subsection.

24. The method of claim 1 wherein the video comprises:

a preselected, digitally enhanced subsection of video prior to the receiving video by the receiver from the sender; and a preselected, non-digitally enhanced subsection of video prior to the receiving video by the receiver from the sender.

25. A system for enhancing a subsection of video, the system comprising:

a user interface;

a video source;

a sending unit including a video region enhancer encoder, the video region enhancer encoder being coupled to receive the video from the video source, the video region enhancer encoder being coupled to receive video region enhancer window selection notifications from the user interface, the video region encoder digitally enhancing a selected subsection of the video responsive to the selected subsection being selected by a video region enhancer decoder;

a receiving unit including the video region enhancer decoder, the video region enhancer decoder being coupled to receive the video from the video region enhancer encoder, the video region enhancer decoder partitioning the video into a selected subsection and an unselected subsection responsive to receiving a selection notification, and transmitting information regarding a position of the selected subsection to the video region enhancer encoder.

26. The system of claim 25 wherein the receiving unit further comprises the user interface.

27. The system of claim 25 wherein the sending unit is remotely located from the receiving unit.

28. The system of claim 27, wherein the sending unit digitally enhances the selected subsection by decreasing the compression of the selected subsection and increasing the compression of the unselected subsection.

29. The system of claim 28 further comprising:

a display coupled to receive the video from the receiving unit.

30. The system of claim 29 wherein the system is a remote medical diagnosis system and the video is displayed to facilitate remote medical diagnosis.

31. The system of claim 29 wherein the system is a security system and the video is displayed to facilitate remote security monitoring.

32. The system of claim 29 wherein the system is a videoconferencing system.

33. The system of claim 25 wherein the receiving unit performs, gray-out of the unselected subsection.

34. The system of claim 25 wherein the sending unit digitally enhances the selected subsection by generating the video having a first video update rate for providing the selected subsection and a second video update rate for providing the unselected subsection, the first video update rate being greater than the second video update rate.

35. The system of claim 25 wherein the video has a characteristic video information density measurable by bits per area, video information density describing an amount of video information used to represent an area of the video, the selected and unselected subsections of the video having a first video information density prior to the video region enhancer digitally enhancing the selected subsection; and the sending unit digitally enhances the selected subsection by generating the video including video for the selected subsection having a second video information density and video for the unselected subsection having a third video information density, the second video information density being greater than the third video information density to provide greater detail in the selected subsection of the video image.

36. A method for enhancing a region of video, the method comprising:

selecting a region of video for digital enhancement, the selecting the region of video for enhancement including defining a selected region of the video and a remainder unselected region of the video such that the video consists of the selected region and the unselected region; and digitally enhancing the selected region; wherein the video has a first video information density measurable by bits per area, the first video information density describing an amount of video information used to represent an area of the video, the selected and unselected regions of the video having the first video information density prior to the digitally enhancing the selected region; and the digitally enhancing the selected region includes generating the video including the selected region having a second video information density and the unselected region having a third video information density, the second video information density being greater than the third video information density to provide greater detail in the selected region.

37. The method of claim 36 wherein the selecting the region of video for digital enhancement comprises:

receiving a notification identifying an area of video for digital enhancement; and defining the selected region to substantially include the identified area of video.

38. A method for enhancing a subsection of video, the method comprising:

receiving video by a receiver from a sender, the video including information for displaying a video image;

selecting the subsection of the video for digital enhancement, the selecting the subsection of the video for enhancement including partitioning the video image into the selected subsection and a remainder unselected subsection; and receiving the video by the receiver from the sender after selecting the subsection of the video, the video including a digitally enhanced subsection corresponding to the selected subsection after selecting the subsection of the video; wherein the video has a first video information density measurable by bits per area, the first video information density describing an amount of video information used to represent an area of the video, the selected and unselected subsections of the video having the first video information density prior to the partitioning; and the digitally enhanced subsection has a second video information density and the unselected subsection has a third video information density, the second video information density being greater than the third video information density to provide greater detail in the selected subsection.

\* \* \* \* \*